United States Patent [19]

Toyoda et al.

[11] Patent Number: 5,632,818

[45] Date of Patent: May 27, 1997

[54] LIQUID INJECTION APPARATUS FOR USE IN A METHOD OF LINING THE INTERNAL SURFACE OF A PIPE

[75] Inventors: Shigeru Toyoda, Saitama-ken; Shuichi Yagi; Masaaki Itagaki, both of Kanagawa-ken, all of Japan

[73] Assignee: Tokyo Gas Co., Ltd., Tokyo, Japan

[21] Appl. No.: 560,927

[22] Filed: Nov. 20, 1995

[30] Foreign Application Priority Data

Nov. 28, 1994 [JP] Japan ................................ 6-293494
Nov. 28, 1994 [JP] Japan ................................ 6-293495

[51] Int. Cl.⁶ ........................................................ B05C 5/00
[52] U.S. Cl. ........................ 118/683; 118/684; 118/708; 118/710; 118/712; 118/300; 118/306; 118/408
[58] Field of Search .................................. 118/683, 684, 118/708, 710, 712, 50, 300, 306, 408, DIG. 10; 427/238, 239; 264/36, 101; 425/11, 13, 169, 171; 156/287, 294; 138/97, 98; 134/169 C; 285/45, 55

[56] References Cited

U.S. PATENT DOCUMENTS

| | | | |
|---|---|---|---|
| 4,381,727 | 5/1983 | Yamaguchi et al. | 118/408 |
| 4,798,474 | 1/1989 | Daily | 118/408 |
| 5,089,297 | 2/1992 | Koga et al. | 427/238 |
| 5,246,641 | 9/1993 | Perkins et al. | 138/97 |

*Primary Examiner*—Laura Edwards
*Attorney, Agent, or Firm*—Nikaido, Marmelstein, Murray & Oram LLP

[57] ABSTRACT

There is provided a liquid injection apparatus for use in a method of lining the internal surface of a pipe. The apparatus comprises a push car having a frame structure, a liquid tank for storing a necessary amount of liquid to be injected into the pipe, a liquid pump for pumping the necessary amount of liquid so as to inject the liquid into the pipe, and a liquid injection controlling device for controlling the pressure of the liquid being supplied through the liquid pump, for stopping the liquid injection after a predetermined amount of liquid has been injected into the pipe, and for stopping the liquid injection if the liquid pressure in the pipe changes beyond a predetermined range. The liquid tank, the liquid pump and the liquid injection controlling device are installed together in the push car so as to be easily movable.

8 Claims, 6 Drawing Sheets

LIQUID INJECTION APPARATUS FOR USE IN A METHOD OF LINING THE INTERNAL SURFACE OF A PIPE

BACKGROUND OF THE INVENTION

The present invention relates to a liquid injection apparatus, in particular to a liquid injection apparatus for use in a method of lining the internal surface of an existing pipe buried under ground.

There has been known a no-excavation underground pipe lining method in which the internal surface of an existing underground gas pipe, water pipe, etc. are lined with a resin without the necessity of any trenching or excavation. For example, a gas service pipe is buried underground branching from a gas main and extending to a user's house. In the method called no-excavation underground pipe lining, there are substantially two steps involved. In the first step, a pressurized liquid is used to produce a pushing force to introduce a necessary amount of resin into the service pipe through an open end thereof and to move the resin through the pipe until the front end of the resin plug flow reaches an inner end (a position branching from a gas main) of the pipe. In the second step, a suction force is used to suck the resin back from the inner end so as to line the internal surface of the pipe with the resin.

A series of equipments for producing the pressurized liquid and for injecting the same into a gas service pipe, include a liquid tank, a liquid pump and a liquid injection controlling device, all of which are successively connected in series to the open end of a gas service pipe.

However, since the liquid tank, the liquid pump and the liquid injection controlling device must be individually disposed on the ground near the open end of a gas service pipe, and connected in series by several hoses to the pipe, a relatively large ground space is required. Also, since the liquid tank, the liquid pump and the liquid injection controlling device are transported and arranged on the ground in a separate or spaced relationship with one another, the transportation and arrangement thereof have been considered inconvenient.

Moreover, although the liquid injection controlling device is useful for controlling the pressure of the liquid being supplied from the liquid tank and stopping the liquid injection when a predetermined amount of liquid has been injected into the pipe, it fails to cope with pressure changes in the liquid which has already been injected in the pipe and is flowing therethrough. Such pressure changes are usually caused due to a larger or smaller diameter portion involved in a gas service pipe.

Namely, a gas service pipe may involve one or more irregular portions whose diameters are larger or smaller than that of the service pipe itself. If one or more such irregular portions have a diameter larger than the pipe diameter, a predetermined amount of liquid which is usually calculated only in accordance with pipe diameter and pipe length, will be insufficient for moving the injected resin to an inner end of the service pipe, resulting an incompleted lining treatment. Another problem associated therewith is that the lining resin and lining pig(s) will drop into the larger diameter portion, rendering it impossible to continue the lining treatment any further and later suck back the dropped resin and pig(s). On the other hand, if one or more irregular portions have a diameter smaller than the pipe diameter, a predetermined amount of liquid will be too much for moving the injected resin to the inner end of the pipe. As a result, a part of the resin will move past the inner end (a position branching from a gas main) and drop into the gas main. Another problem associated therewith is that lining pig(s) will get stuck and become unmovable in a smaller diameter portion, rendering it impossible to continue the lining treatment any further and later suck back the dropped resin and pig(s).

SUMMARY OF THE INVENTION

An object of the present invention is to solve the above-mentioned problems peculiar to the above-mentioned prior arts and to provide a liquid injection apparatus easy to transport and easy to set on a working site where a lining treatment is to be carried out on an underground pipe.

Another object of the present invention is to provide a liquid injection apparatus capable of dealing with pressure changes in a liquid flow injected in the underground pipe.

According to the present invention, there is provided a liquid injection apparatus for use in a method of lining the internal surface of a pipe, which method includes using the liquid injection apparatus to produce a pressurized liquid to introduce a necessary amount of resin into the pipe through an open end thereof and to cause the resin to move until the front end of the resin reaches an inner end of the pipe, and using a suction apparatus to suck the resin back from the inner end so as to line the internal surface of the pipe with the resin. Said liquid injection apparatus comprises a push car having a frame structure, a liquid tank for storing a necessary amount of liquid to be injected into the pipe, a liquid pump for pumping the necessary amount of liquid so as inject the liquid into the pipe, and a liquid injection controlling device for controlling the pressure of the liquid being supplied through the liquid pump, stopping the liquid injection after a predetermined amount of liquid has been injected into the pipe, and stopping the liquid injection if the liquid pressure in the pipe changes beyond a predetermined range. In particular, the liquid tank, the liquid pump and the liquid injection controlling device are installed together in the push car so as to be easily movable.

The liquid tank is an elongated container vertically installed within the rear portion of the frame structure of the push car, the liquid pump is positioned in front of the liquid tank at a lower portion of the frame structure, and liquid injection controlling device is positioned in front of the liquid tank at an upper portion of the frame structure.

The liquid injection controlling device includes a liquid pressure governor for rendering the extra liquid to flow back to the liquid tank if the pressure of the liquid being supplied through the liquid pump becomes higher than a predetermined value. The liquid injection controlling device further includes a flow meter for measuring the liquid flow rate and for producing a pulse signal indicating a quantity of liquid flow. Also, the liquid injection controlling device includes a counter means for counting the pulse signals from the flow meter and for producing a stopping signal to stop the liquid injection after a predetermined quantity of liquid has been injected into the pipe. In this regard, the liquid injection controlling device further includes an electromagnetic valve responsive to the stopping signal from the counter means to stop said liquid injection.

In addition, the liquid injection controlling device further includes a pressure gauge for detecting a pressure of the liquid flowing in the pipe, a controller means connected with the pressure gauge for producing a slopping signal to stop the liquid injection if the liquid pressure in the pipe changes beyond a predetermined range. The slopping signal from the controller means is applied to the electromagnetic valve to stop the liquid injection.

The above objects and features of the present invention will become more understood from the following description with reference to the accompanying drawings.

DETAILED DESCRIPTION OF THE PREFERRED EMBODIMENTS

Figure 1:
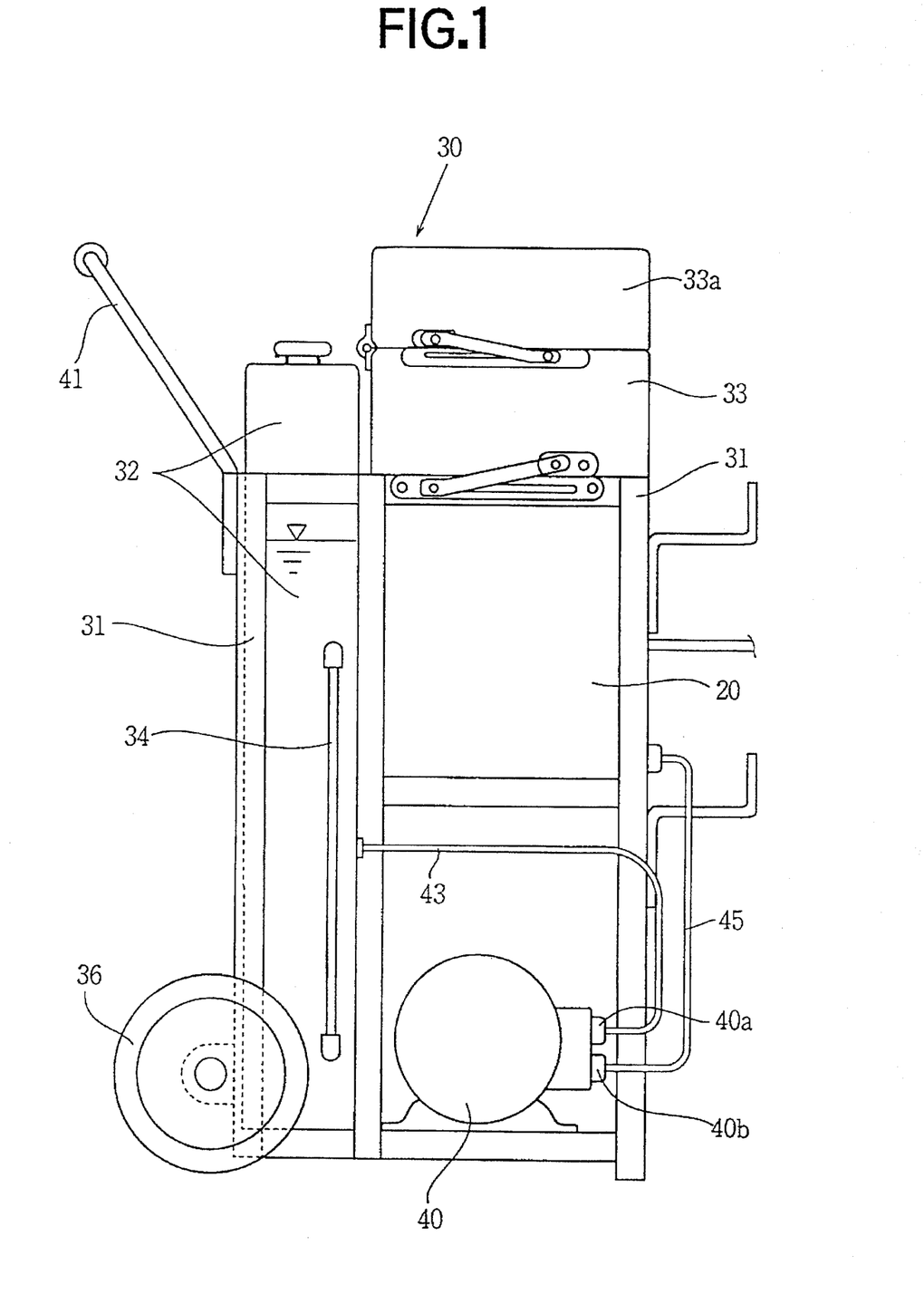
FIG. 1 is a side elevational view illustrating a liquid injection apparatus according to the present invention.
Figure 2:
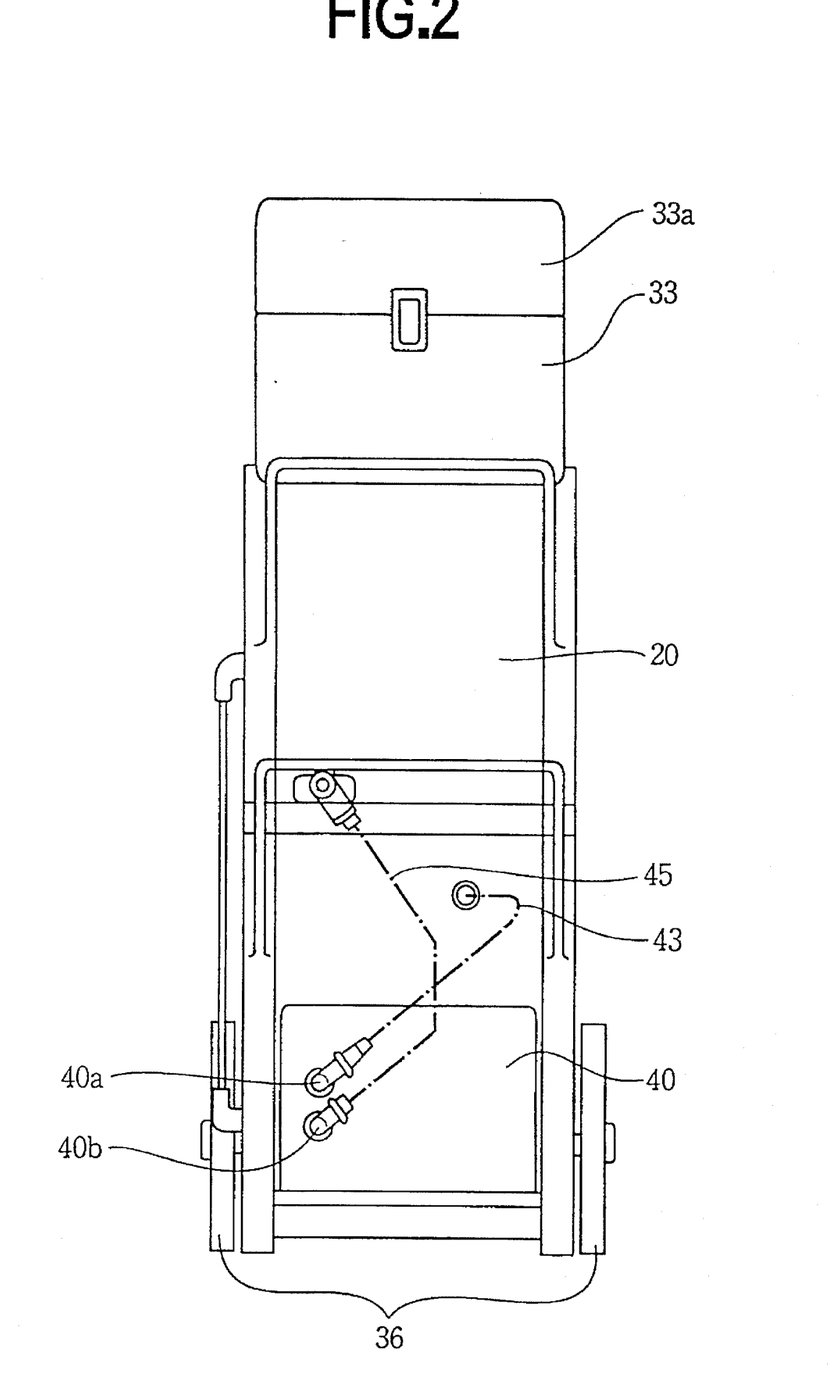
FIG. 2 is a front view of the liquid injection apparatus of FIG. 1.

Referring to FIGS. 1 and 2, a liquid injection apparatus 30 according to the present invention, includes a push car comprising a frame structure 31, a pair of running wheels 36 disposed on opposite sides of the frame structure 31 at the lower sides thereof, a handle 41 provided on the upper rear side of the frame structure 31 for pushing or pulling the push car by slightly tilting it. In detail, the liquid injection apparatus 30 includes a liquid tank 32 for storing a necessary amount of liquid to be injected into an existing underground pipe to be treated, a liquid pump 40 for pumping the necessary amount of liquid so as to inject the liquid into the pipe, and a liquid injection controlling device 20 for controlling the pressure of the liquid being supplied from the liquid pump 40, stopping the liquid injection after a predetermined amount of liquid has been injected into the pipe, and stopping the liquid injection if the liquid pressure in the pipe changes beyond a predetermined range. Conveniently, the liquid tank 32, the liquid pump 40 and the liquid injection controlling device 20 are installed together in the push car so as to be easily movable.

In particular, the liquid tank 32 is an elongated container vertically installed within the rear portion of the frame structure 31 of the push car, the liquid pump 40 is positioned in front of the liquid tank 32 at a lower portion of the frame structure 31, and the liquid injection controlling device 20 is positioned in front of the liquid tank 32 at an upper portion of the frame structure 31. The liquid injection controlling device 20 has a display section 33 provided on the top of the frame structure 31. A cover 33a is hinged on the display section 33 so that it may be opened when in operation and closed after the operation is over.

Figure 3:
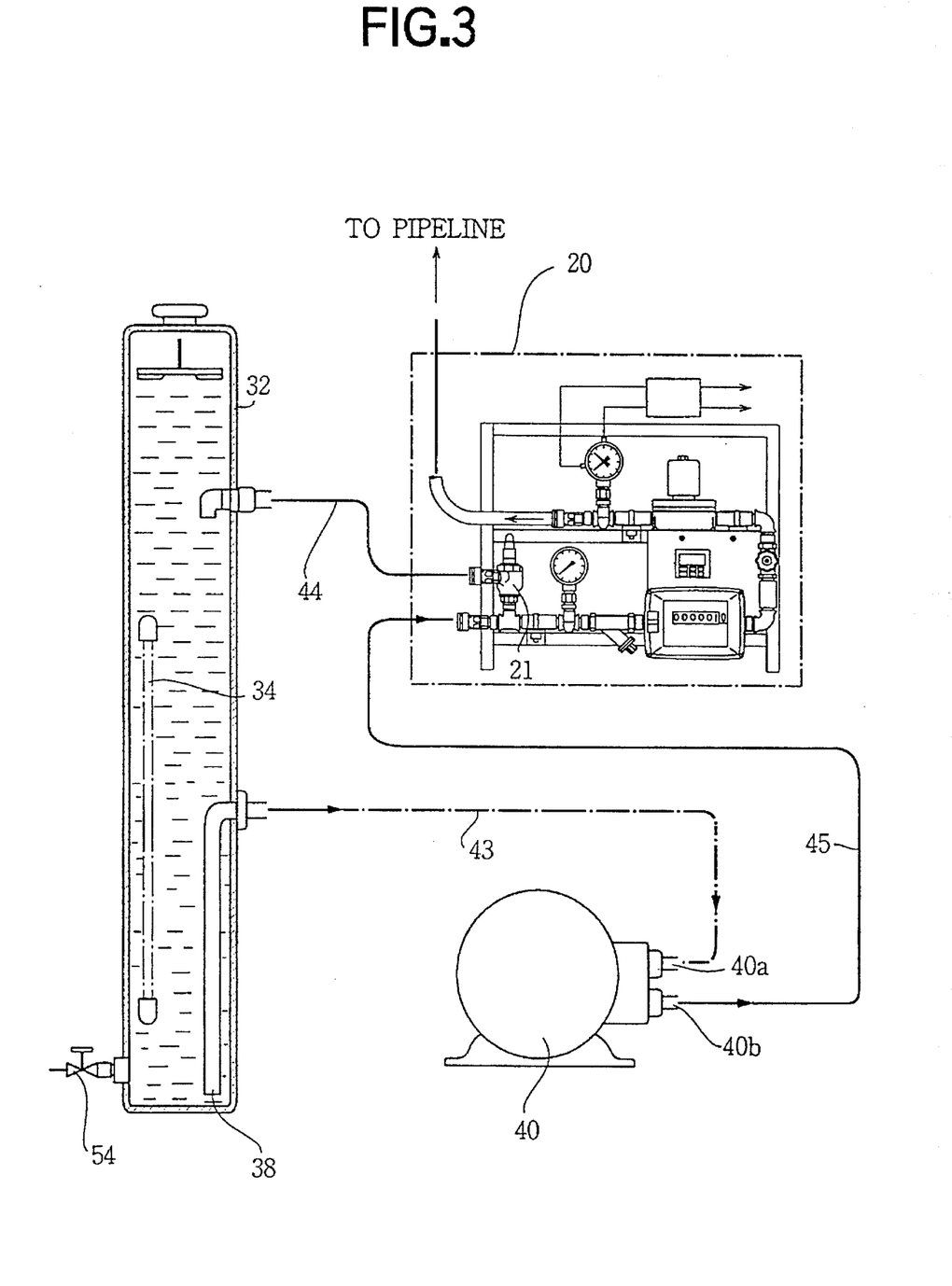
FIG. 3 is an explanatory view illustrating a liquid flowing system within the liquid injection apparatus of FIG. 1.

Referring again to FIGS. 1 and 2, the liquid tank 32 is provided with a liquid level gauge 34 for inspecting the liquid level within the liquid tank 32, and is further provided with a drain outlet 54 for draining off remaining liquid (FIG. 3). A hose 43 is extending from the liquid tank 32 to the liquid pump 40 through a pump inlet 40a, and another hose 45 is extending from a pump outlet 40b to the liquid injection controlling device 20.

Referring to FIG. 3, when the liquid pump 40 is operated, a liquid such as water is pumped from the liquid tank 32 through a suction tube 38 and the hose 43 into the liquid pump 40 and caused to flow out of the pump so as to form an pressurized liquid which flows into the liquid injection controlling device 20. The water flowing out of the liquid injection controlling device 20 further flows toward a pipeline which is to be treated in the lining treatment. In addition, by means of a liquid pressure governor 21 provided in the liquid injection controlling device 20, an extra water is caused to flow back through a hose 44 to the liquid tank 32 if the pressure of the liquid being supplied through the liquid pump 40 becomes higher than a predetermined value.

Figure 4:
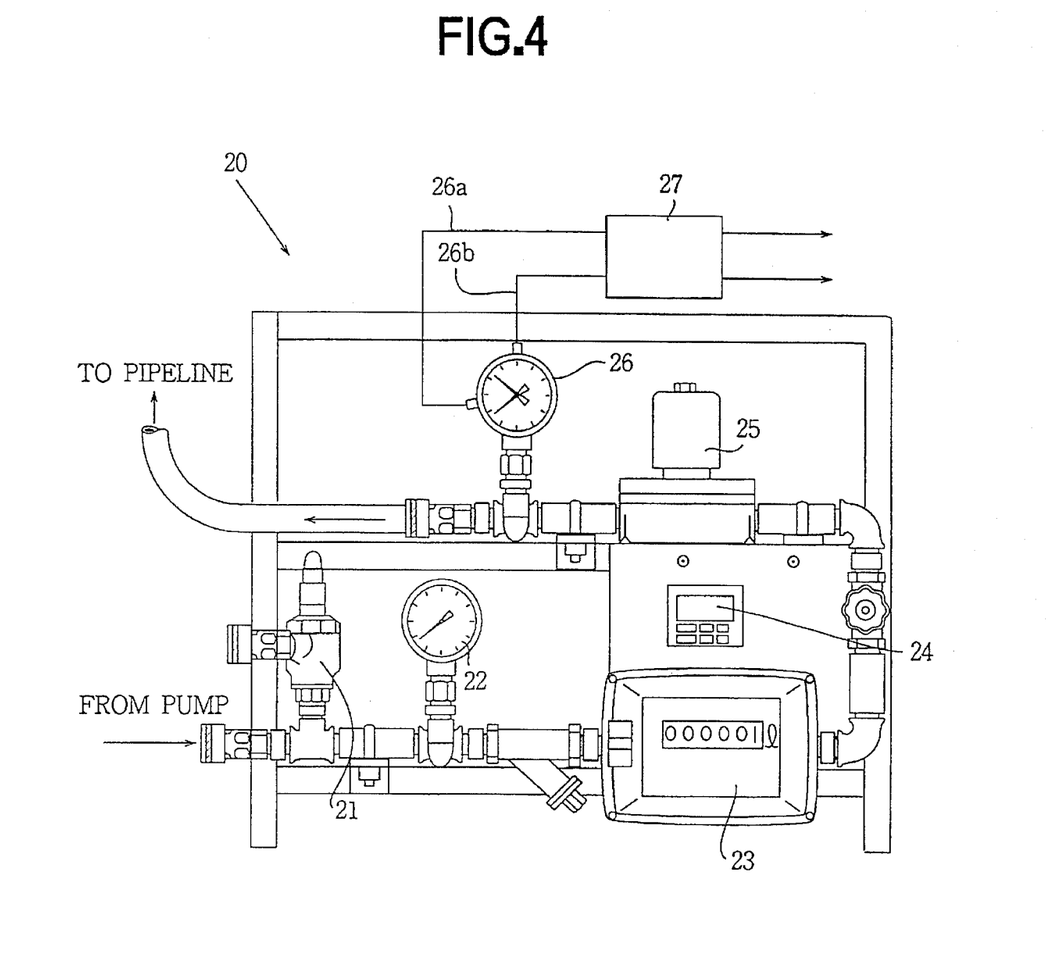
FIG. 4 is an explanatory view illustrating a liquid injection controlling device incorporated in the liquid injection apparatus of FIG. 1.

Referring to FIG. 4, the liquid injection controlling device 20 includes a liquid pressure governor 21 whose function has already been described above, a pressure gauge 22 for detecting and inspecting the pressure of the liquid being supplied from the liquid pump 40. The liquid injection controlling device 20 further includes a flow meter 23 for measuring the liquid flow rate and for producing a pulse signal indicating a quantity of liquid flow. Also, the liquid injection controlling device 20 includes a counter means 24 for counting the pulse signals from the flow meter 23 and for producing an injection stopping signal after a predetermined quantity of liquid has been injected into the pipeline. In this regard, the liquid injection controlling device 20 includes a electromagnetic valve 25 which is responsive to the liquid injection stopping signal from the counter means 24 so as to stop the liquid injection.

Further, the liquid injection controlling device 20 includes another pressure gauge 26 for detecting the pressure of the liquid flowing in the pipeline, a controller means 27 connected with the pressure gauge 26 for producing an injection stopping signal to stop the liquid injection if the liquid pressure in the pipe changes beyond a predetermined range. The stopping signal from the controller means 27 is applied to the electromagnetic valve 25 which stops the liquid injection.

As illustrated in FIG. 4, the pressure gauge 26 has two indicating needles, one for detecting and indicating a lower limit of an allowable pressure range, the other for detecting and indicating a higher limit of the pressure range. Therefore, if a pressure of the liquid flowing in the pipe becomes higher than the higher limit or lower than the lower limit, such pressure changes can be soon detected by the pressure gauge 26. A signal representing a pressure change beyond an allowable range is applied to the controller means 27 through signal line 26a (for transmitting a lower pressure signal) or 26b (for transmitting a higher pressure signal). Then, the controller means 27 produces an injection stopping signal to stop the liquid injection. Hence, eletromagnetic valve 25, which is also responsive to the stopping signal from the controller means 27, is closed so that the liquid injection is stopped.

The use of the liquid injection apparatus 30 in an actual underground pipe lining operation will be described as follows.

Figure 5:
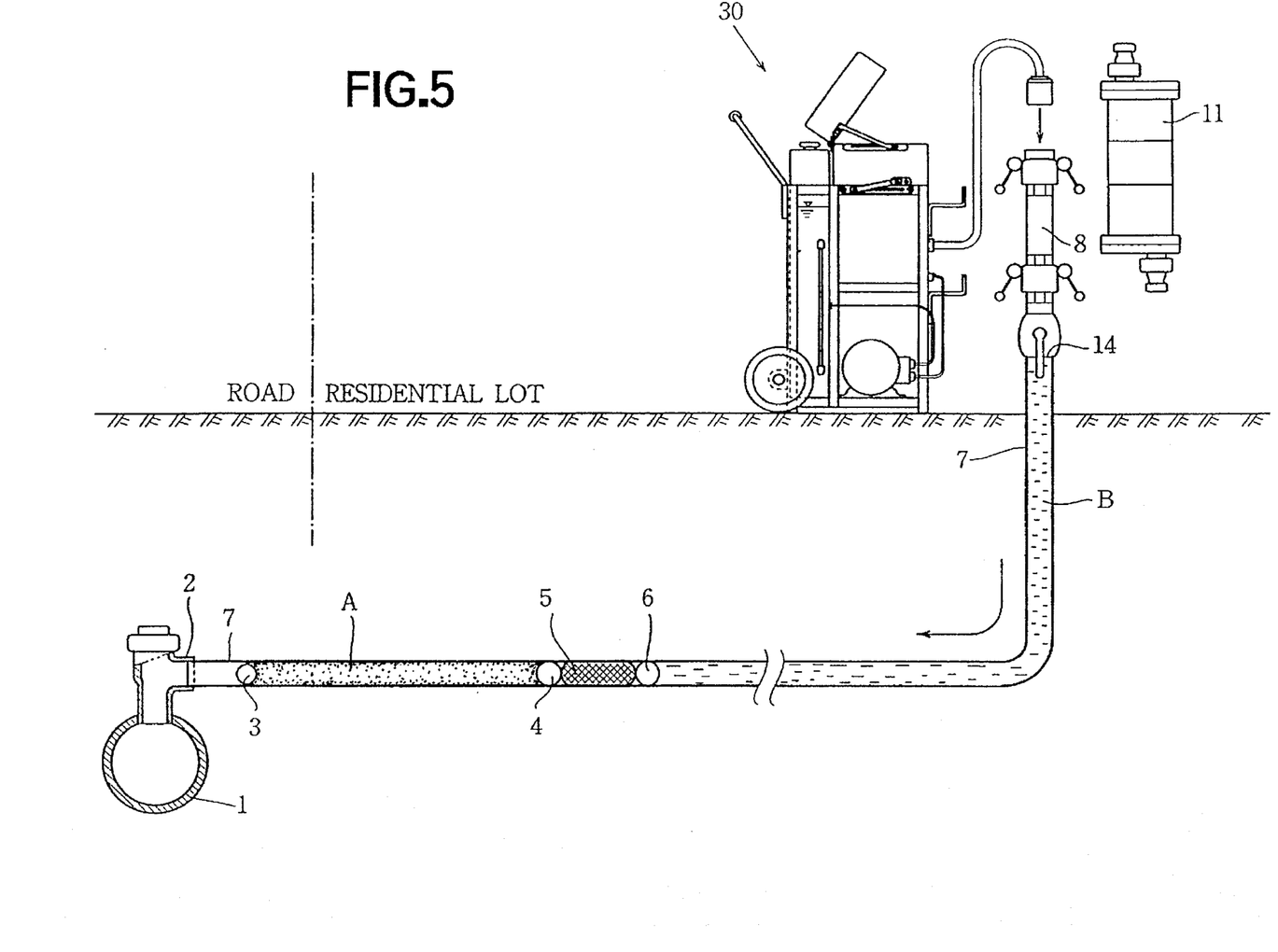
FIG. 5 is an explanatory view illustrating an operation where the liquid injection apparatus of FIG. 1 is used to inject a resin and liquid into a gas service pipe for the lining treatment thereof.

FIG. 5 is an explanatory view illustrating a first step of a no-excavation underground pipe lining method where the liquid injection apparatus 30 is used to inject a resin and liquid into an existing underground pipe for the lining treatment thereof.

Referring to FIG. 5, an existing underground pipe such as a gas service pipe 7 is buried under ground branching from a gas main 1. As shown in FIG. 5, the liquid injection apparatus 30 is positioned closed to an open end 14 of the gas service pipe 7 which is to be treated in the lining treatment. At first, a lining pig 3 is inserted in the pipe 7 through its open end 14. Then, a necessary amount of resin A for lining the internal surface of the pipe 7 is introduced into the pipe by a force of a pressurized liquid (such as water) using the liquid injection apparatus 30, by means of a resin injection device 11. Afterwards, a resin transporting pig 4, a liquid absorbing material 5 and a liquid blocking pig 6 are introduced into the pipe by the force of the same pressurized liquid, with the use of a pig cassette 8. Subsequently, by continually operating the pump 40, a necessary amount of liquid B is pumped from the liquid tank 32, to flow through the liquid injection controlling device 20 into the pipe 7. In this way, the resin A is moved forward through the pipe 7 until the front end of the resin plug flow A reaches an inner end 2 (a position branching from the gas main 1).

During the process while the resin A is being moved forward through the underground pipe 7 by the pressurized liquid B, there might be some significant pressure changes in liquid B, usually caused due to larger or smaller diameter portions (not shown) involved in the pipe. If the lining pig 3 and the resin A encounter with a larger diameter portion (not shown), the lining pig 3 and part of the resin A will drop thereinto, thus the pressure of the liquid B flowing behind will suddenly drop. On the other hand, if the lining pig 3 and the resin A encounter with a smaller diameter portion, the lining pig 3 will get stuck and become unmovable in the smaller diameter portion, thus the pressure of the liquid B flowing behind will suddenly rise. Nevertheless, with the use of the liquid injection controlling device 20, if the pressure of the liquid B becomes higher than a higher limit or lower than a lower limit of a predetermined allowable range, such a pressure change is soon detected by the pressure gauge 26. A signal representing such a pressure change is applied to the controller means 27. Then, the controller means 27 produces a stopping signal to stop the liquid injection. Hence, the eletromagnetic valve 25, which is responsive to the stopping signal from the controller means 27, is closed so that the liquid injection is stopped. After the liquid injection is stopped, a person in charge of the operation can decide to carry out the second step (suction) of the lining method which will be described later. Therefore, it is possible to carry out a lining treatment on a gas service pipe in a controlled manner, avoiding any possible troubles due to sudden and significant pressure changes in the pipe.

Figure 6:
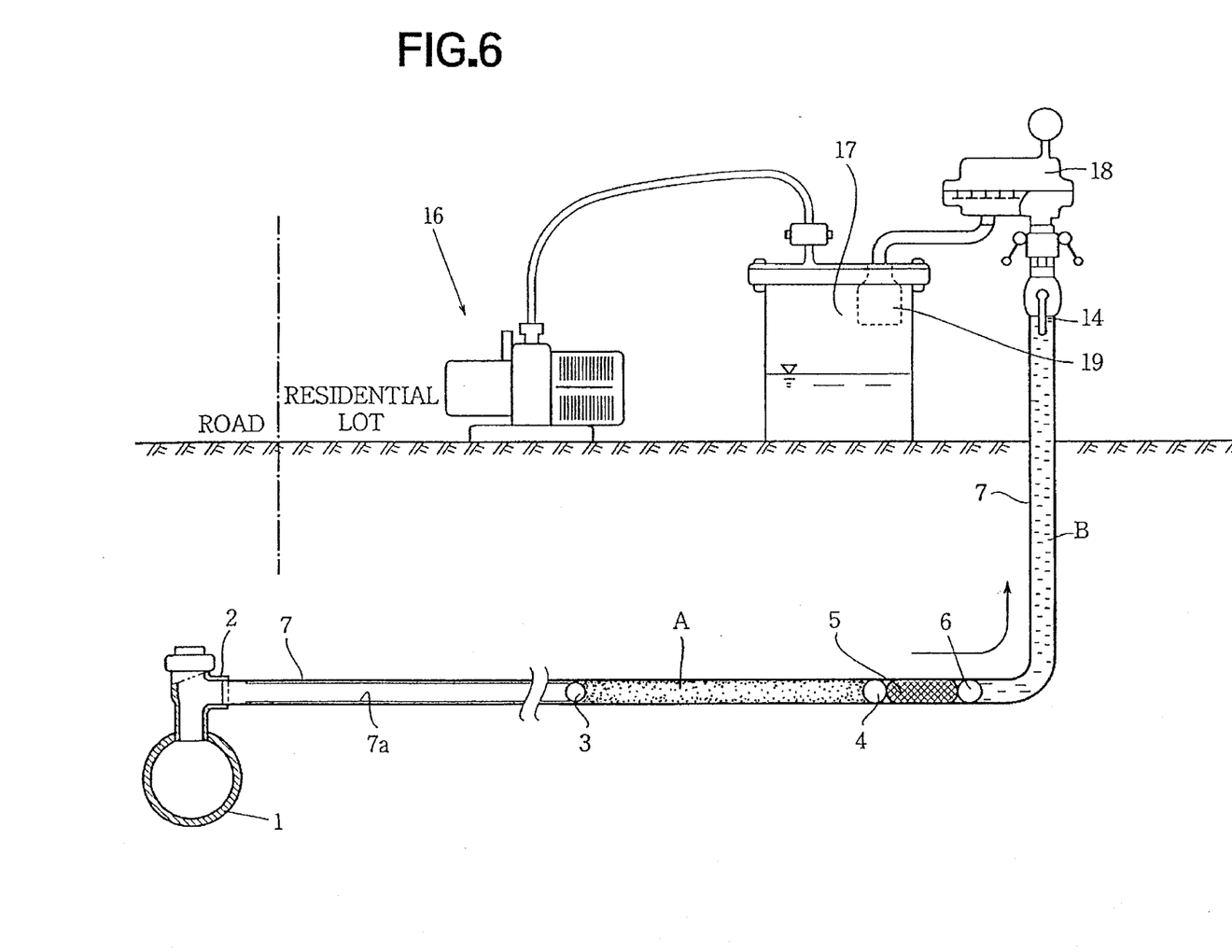
FIG. 6 is an explanatory view illustrating an operation where the internal surface of the gas service pipe is lined with a resin by causing the injected resin to flow back.

FIG. 6 is an explanatory view illustrating the second step of the no-excavation underground pipe lining method where the internal surface of the gas service pipe 7 is lined with the resin A.

Referring to FIG. 6, a pig receiving device 18 is attached to the open end 14 of the pipe 7 in order to receive various pigs returning from the pipe 7. A tank 17 is connected with the pig receiving device 18 to recover liquid B flowing back from the pipe 7. A resin separating means 19, which allows the passing of liquid but stops the resin mixed in the liquid, is provided within the tank 17. A suction pump 16 is connected with the tank 17.

By operating the suction pump 16, the liquid B is sucked back from inside the pipe 7, so that the liquid blocking pig 6, liquid absorbing material 5, resin transporting pig 4, resin A and lining pig 3 are all moved backwardly. As illustrated in FIG. 6, while the resin plug flow A is being moved back, a resin layer 7a is formed on the internal surface of the pipe 7. With the use of the lining pig 7, it is possible to obtain an even resin layer having a uniform thickness along the entire length of the pipe 7.

It is understood from the above description that, with the use of the liquid injection apparatus 30 of the present invention, the liquid tank 30, the liquid pump 40 and the liquid injection controlling device 20 may be received and installed together in a push car, so that the transportation and setting thereof on a working site have become more convenient than before.

In addition, with the use of the improved liquid injection controlling device 20 incorporated in the above liquid injection apparatus, it becomes possible to cope with undesirable sudden pressure changes in a pipe being treated. Therefore, it is possible to carry out a lining treatment on an underground pipe in a controlled manner, avoiding any possible troubles due to sudden pressure changes.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A liquid injection apparatus for use in a method of lining an internal surface of a pipe, which method including using the liquid injection apparatus to introduce a necessary amount of resin into the pipe through an open end thereof and to cause the resin to move until the front end of the resin reaches an inner end of the pipe, and sucking the resin back from the inner end so as to line the internal surface of the pipe with the resin, said liquid injection apparatus comprising:

a push car having a frame structure;

a liquid tank for storing a necessary amount of liquid to be injected into the pipe;

a liquid pump for pumping the necessary amount of liquid so as to inject the liquid into the pipe: and a liquid injection controlling device for controlling the pressure of the liquid being supplied through the liquid pump, stopping the liquid injection after a predetermined amount of liquid has been injected into the pipe, and stopping the liquid injection if the liquid pressure in the pipe changes beyond a predetermined range;

wherein the liquid tank, the liquid pump and the liquid injection controlling device are installed together in the push car so as to be easily movable.

2. The liquid injection apparatus according to claim 1, wherein the liquid tank is an elongated container vertically installed within a rear portion of the frame structure of the push car, the liquid pump is positioned in front of the liquid tank at a lower portion of the frame structure, and the liquid injection controlling device is positioned in front of the liquid tank at an upper portion of the frame structure.

3. The liquid injection apparatus according to claim 1, wherein the liquid injection controlling device includes a liquid pressure governor for rendering extra liquid to flow back to the liquid tank if the pressure of the liquid being supplied through the liquid pump becomes higher than a predetermined value, and for controlling fluid pressure within the pipe.

4. The liquid injection apparatus according to claim 1, wherein the liquid injection controlling device further includes a flow meter for measuring the liquid flow rate and for producing a pulse signal indicating a quantity of liquid flow.

5. The liquid injection apparatus according to claim 4, wherein the liquid injection controlling device further includes a counter means for counting the pulse signals from the flow meter and for producing a stopping signal to stop the liquid injection after a predetermined quantity of liquid has been injected into the pipe.

6. The liquid injection apparatus according to claim 5, wherein the liquid injection controlling device further includes an electromagnetic valve responsive to the stopping signal from the counter means to stop said liquid injection.

7. The liquid injection apparatus according to claim 1, wherein the liquid injection controlling device further includes a pressure gauge for detecting the pressure of the liquid flowing in the pipe, a controller means connected with the pressure gauge for producing a stopping signal to stop the liquid injection if the liquid pressure in the pipe changes beyond a predetermined range.

8. The liquid injection apparatus according to claim 6, wherein the stopping signal from the controller means is applied to the electromagnetic valve to stop the liquid injection.

* * * * *